(12) United States Patent
Pritchard

(10) Patent No.: US 9,784,321 B2
(45) Date of Patent: Oct. 10, 2017

(54) POWERTRAIN WHEEL-END ROTATIONAL DISCONNECT ASSEMBLY

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/054,421

(22) Filed: Feb. 26, 2016

(65) Prior Publication Data

US 2016/0265602 A1 Sep. 15, 2016

Related U.S. Application Data

(60) Provisional application No. 62/130,675, filed on Mar. 10, 2015.

(51) Int. Cl.
| | |
|---|---|
| *F16D 11/10* | (2006.01) |
| *B60B 27/00* | (2006.01) |
| *F16D 11/14* | (2006.01) |
| *F16D 27/118* | (2006.01) |
| *F16D 27/00* | (2006.01) |
| *F16D 3/223* | (2011.01) |
| *F16D 11/00* | (2006.01) |

(52) U.S. Cl.
CPC .......... *F16D 11/10* (2013.01); *B60B 27/0042* (2013.01); *F16D 11/14* (2013.01); *F16D 27/118* (2013.01); *F16D 27/004* (2013.01); *F16D 2003/22326* (2013.01); *F16D 2011/002* (2013.01)

(58) Field of Classification Search
None
See application file for complete search history.

(56) References Cited

U.S. PATENT DOCUMENTS 2,848,085 A * 8/1958 Righetto ................. F16D 27/08
192/110 R
5,827,148 A * 10/1998 Seto .................. B60W 30/1819
477/15

(Continued)

FOREIGN PATENT DOCUMENTS

GB 2429032 A 2/2007

*Primary Examiner* — Mark Manley
(74) *Attorney, Agent, or Firm* — Howard & Howard Attorneys PLLC

(57) ABSTRACT

A wheel-end disconnect assembly for translating rotational torque between an output shaft and a wheel hub of a vehicle driveline. A knuckle bracket at least partially supports the wheel hub. A clutch is operatively attached to the knuckle bracket, is disposed in selective torque translating relationship between the output shaft and the wheel hub, and is movable between: an engaged configuration wherein torque is translated between the output shaft and the wheel hub, and a disengaged configuration wherein torque is interrupted. An electromagnetic actuator is provided and has a slider selectively movable between a first stable position and a second stable position. The actuator is disposed in force translating relationship with the clutch such that movement from one stable position to the other stable position causes corresponding movement of the clutch between the configurations so as to selectively translate rotational torque between the output shaft and the wheel hub.

17 Claims, 5 Drawing Sheets

(56) References Cited

U.S. PATENT DOCUMENTS

| | | |
|---|---|---|
| 8,888,658 B2 | 11/2014 | Pritchard |
| 2006/0225985 A1* | 10/2006 | Dimig .................... B60N 2/442 192/84.1 |
| 2010/0276245 A1* | 11/2010 | Umeno ................... F16D 11/10 192/69.81 |
| 2012/0067689 A1 | 3/2012 | Eastman |
| 2014/0205468 A1 | 7/2014 | Pritchard |

* cited by examiner

POWERTRAIN WHEEL-END ROTATIONAL DISCONNECT ASSEMBLY

CROSS-REFERENCE TO RELATED APPLICATIONS

The present application claims priority to and all the benefits of U.S. Provisional Patent Application No. 62/130, 675, filed on Mar. 10, 2015, which is hereby expressly incorporated herein by reference in its entirety.

BACKGROUND OF INVENTION

1. Field of Invention

The present invention relates, generally, to automotive powertrain systems and, more specifically, to a wheel-end disconnect assembly for powertrain systems.

2. Description of the Related Art

Conventional automotive vehicles known in the art include a powertrain system in rotational communication with one or more drivelines. Typically, the vehicle includes a pair of drivelines, each defined by a respective pair of opposing wheels. The powertrain system includes a propulsion system adapted to generate and selectively translate rotational torque to one or more of the wheels so as to drive the vehicle. To that end, in conventional automotive powertrain systems, the propulsion system is typically realized as an internal combustion engine in rotational communication with a transmission. The engine generates rotational torque which is selectively translated to the transmission which, in turn, translates rotational torque to one or more of the drivelines. The transmission multiplies the rotational speed and torque generated by the engine through a series of predetermined gear sets, whereby changing between gear sets enables the vehicle to travel at different vehicle speeds for a given engine speed.

In so-called "four-wheel-drive" or "all-wheel-drive" powertrain systems, both drivelines are used to drive the vehicle. To that end, all wheel drive powertrain systems typically include a transfer case disposed in rotational communication with the transmission and adapted to split rotational torque between the drivelines. The transfer case may be spaced from the transmission, or may be integrated with the transmission. Where the transfer case is spaced from the transmission, a driveshaft is used to translate rotational torque from the transmission to the transfer case. Driveshafts are also typically used to connect the transfer case to each respective driveline. Conventional drivelines are commonly realized by a differential assembly adapted to receive rotational torque from the transfer case and subsequently split rotational torque between opposing wheels. To that end, each driveline also typically includes a pair of continuously-variable joints disposed in torque translating relationship with the differential and each respective opposing wheel.

Depending on the specific configuration of the powertrain system, the percentage of torque split between the drivelines may vary. Moreover, depending on the vehicle application, the transfer case and/or driveline(s) may be configured to interrupt rotational torque to one of the drivelines under certain operating conditions. Specifically, the powertrain system may be configured such that the vehicle can be selectively operated in "two-wheel-drive" or in "four-wheel-drive". Moreover, the powertrain system may be configured to automatically and continuously control how much rotational torque is sent to each driveline. Thus, the powertrain system may be configured to send a higher percentage of available torque to one of the drivelines under certain vehicle operating conditions, and a lower percentage of available torque to the same driveline under different vehicle operating conditions. By way of non-limiting example, the powertrain system may be configured such that 80% of torque is sent to a front driveline and 20% of torque is sent to a rear driveline until there is a loss of traction or wheel spin, whereby the powertrain subsequently adjusts torque split such that 50% of torque is sent to each driveline.

Depending on the vehicle application, rotational torque may only be required at both drivelines relatively infrequently. Thus, the vehicle may be designed to operate primarily in "two-wheel-drive" so as to minimize parasitic loss and optimize powertrain system efficiency. Moreover, optimizing how torque is split between drivelines can lead to significant improvements in vehicle efficiency. Thus, in order to decrease parasitic losses in the powertrain system, it is advantageous to selectively disconnect one or more driveshafts and/or continuously-variable joints from rotational communication with the transfer case, transmission, and/or differentials. To that end, rotational disconnects are used to selectively interrupt rotation between powertrain system components, whereby a controller and an actuator are typically used to selectively control the rotational disconnect. The controller energizes the actuator which, in turn, engages the rotational disconnect so as to couple (or, de-couple) the powertrain system components.

Each of the components and systems of the type described above must cooperate to effectively and selectively translate rotational torque to the driven wheels of the vehicle. In addition, each of the components and systems must be designed not only to facilitate improved performance and efficiency, but also so as to reduce the cost and complexity of manufacturing vehicles. While powertrain rotational disconnect systems known in the related art have generally performed well for their intended use, there remains a need in the art for a wheel-end rotational disconnect assembly that has superior operational characteristics and a reduced overall packaging size, and, at the same time, that reduces the cost and complexity of manufacturing vehicles that operate with high efficiency under a number of different driving conditions.

SUMMARY OF THE INVENTION

The present invention overcomes the disadvantages in the related art in a wheel-end disconnect assembly for use in selectively translating rotational torque between an output shaft and a wheel hub of a vehicle driveline. The wheel-end disconnect assembly includes a knuckle bracket, a clutch assembly, and an electromagnetic actuator. The knuckle bracket at least partially supports the wheel hub. The clutch assembly is operatively attached to the knuckle bracket, is disposed in selective torque translating relationship between the output shaft and the wheel hub, and is movable between: an engaged configuration wherein rotational torque is translated between the output shaft and the wheel hub; and a disengaged configuration wherein rotational torque is interrupted between the output shaft and the wheel hub. The electromagnetic actuator has a slider selectively movable between a first stable position and a second stable position. The actuator is disposed in force translating relationship with the clutch assembly such that movement of the slider from one of the stable positions to the other of the stable positions causes corresponding movement of the clutch assembly between the configurations so as to selectively translate rotational torque between the output shaft of the driveline and the wheel hub of the driveline.

In this way, the wheel-end disconnect assembly of the present invention significantly improves the performance of vehicle powertrain systems by enabling simple and space-efficient implementation of selective rotational torque interruption. More specifically, those having ordinary skill in the art will appreciate that the wheel-end disconnect assembly of the present invention is configured such that the coil of the actuator need not be continually supplied with electrical current to maintain the relative clutch assembly configuration. Moreover, it will be appreciated that the electromagnetic actuator can be configured so as to significantly minimize the overall packaging size of the wheel-end disconnect assembly while, at the same time, affording significant improvements in vehicle powertrain functionality. Further, the present invention can be used in connection with a number of different types of powertrain systems, and in a number of different ways. Further still, the present invention reduces the cost and complexity of manufacturing vehicles that have superior operational characteristics, such as high efficiency, reduced weight, component packaging, component life, and vehicle drivability.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
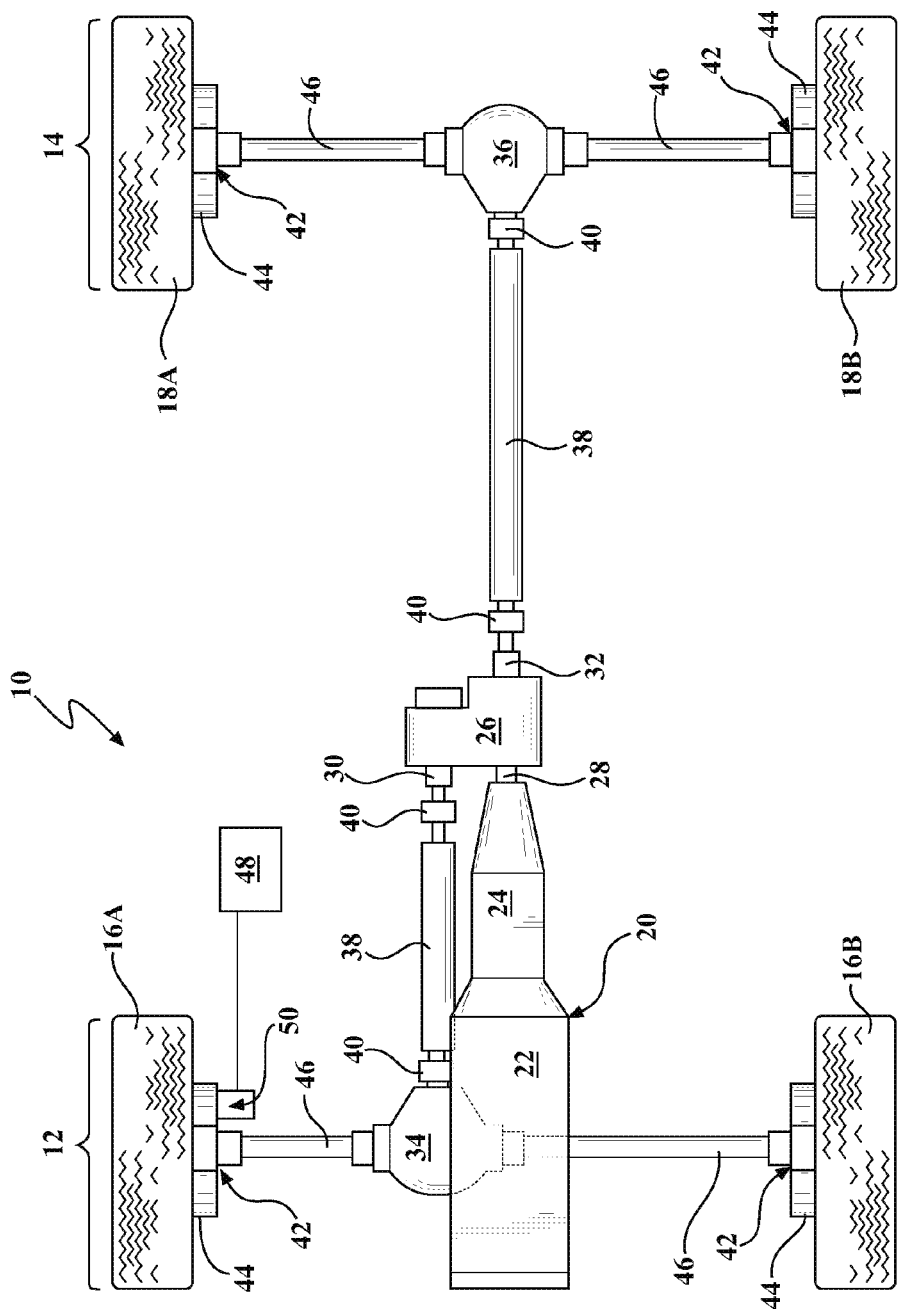
FIG. 1 is a schematic plan view of a vehicle powertrain system showing a wheel hub and a wheel-end disconnect assembly according to the present invention.

Referring now to the figures, where like numerals are used to designate like structure unless otherwise indicated, a vehicle powertrain system is schematically illustrated at 10 in FIG. 1. The powertrain system 10 includes a first driveline 12 and a second driveline 14. The first driveline 12 includes a first pair of opposing wheels 16A, 16B, and the second driveline 14 includes a second pair of opposing wheels 18A, 18B. Those having ordinary skill in the art will recognize this as a conventional "four wheeled" vehicle design commonly used in automotive applications. However, as will be appreciated from the subsequent discussion below, the vehicle could include any number of drivelines with any suitable number of wheels without departing from the scope of the present invention. The powertrain system 10 also includes a propulsion system 20 that acts to generate and translate rotational torque the first and second drivelines 12, 14. Each of these components and systems will be described in greater detail below.

In the representative example illustrated in FIG. 1, the propulsion system 20 is realized as a conventional internal combustion engine 22 disposed in rotational communication with a transmission 24. The engine 22 generates rotational torque which is selectively translated to the transmission 24 which, in turn, multiplies the rotational speed and torque generated by the engine 22. Those having ordinary skill in the art will appreciate that transmission 24 can be designed in several different ways and, as such, can be disposed in rotational communication with the engine 22 in any suitable way depending on the application. By way of non-limiting example, the transmission 24 could include a gear set (not shown, but generally known in the art) that is either manually or automatically actuated, or the transmission 24 could be continuously variable. Moreover, while FIG. 1 shows the engine 22 and transmission 24 operatively attached to one another, it will be appreciated that the transmission 24 could spaced from the engine 22 so as to improve weight distribution of the vehicle without departing from the scope of the present invention. Further, it will be appreciated that the propulsion system 20, engine 22, and/or transmission 24 could be of any suitable type, configured in any suitable way sufficient to generate and translate rotational torque to the drivelines 12, 14, without departing from the scope of the present invention. By way of non-limiting example, the propulsion system 20 could employ what is commonly referred to in the related art as a "hybrid engine," whereby rotational torque translated to the drivelines 12, 14 is generated by the engine 22 as well as by one or more electric motors (not shown, but generally known in the art). Similarly, the powertrain system 10 could omit an internal combustion engine 22 altogether, such as in a so-called "electric vehicle powertrain" wherein the propulsion system 20 employs one or more electric motors to drive the vehicle (not shown, but generally known in the related art).

The powertrain system 10 also includes a transfer case 26 disposed in rotational communication with the transmission 24. The transfer case 26 is configured to split rotational torque from the transmission 24 between the drivelines 12, 14, as described in greater detail below. In the representative embodiment illustrated herein, the transfer case 26 is situated in-line with the transmission 24 and is disposed in rotational communication therewith via a transmission output shaft 28. However, those having ordinary skill in the art will appreciate that the transfer case 26 and transmission 24 could be disposed in rotational communication with each other in a number of different ways without departing from the scope of the present invention. By way of non-limiting example, the transfer case 26 could be integrated with the transmission 24, or the transmission 24 and transfer case 26 could be offset from one another and could be in rotational communication via an intermediate shaft with one or more universal joints (not shown, but generally known in the art), thereby enabling additional flexibility with respect to weight distribution and packaging of the drivetrain 10.

The transfer case 26 includes a first output 30 and a second output 32 disposed in torque translating relationship with the first driveline 12 and the second driveline 14, respectively. In the representative embodiment illustrated herein, each of the drivelines 12, 14 includes a respective differential assembly 34, 36, a driveshaft 38, and one or more universal joints 40. The driveshaft 38 and universal joints 40 connect the outputs 30, 32 of the transfer case 26 to the respective differentials 34, 36 of the drivelines 12, 14. Thus, the first differential assembly 34 is disposed in torque translating relationship with the first output 30 of the transfer case 26 and translates rotational torque to the first pair of wheels 16A, 16B; and the second differential assembly 36 is disposed in torque translating relationship with the second output 32 of the transfer case 26 and translates rotational torque to the second pair of wheels 18A, 18B. Each of the wheels 16A, 16B, 18A, 18B is mounted to a respective wheel hub 42 configured to facilitate rotation in operation. Similarly, the wheel hubs 42 are each supported by a respective knuckle bracket 44 mounted to the vehicle (mounting not shown in detail). In order to translate rotation to the wheels 16A, 16B, 18A, 18B so as to drive the vehicle in operation, each of the drivelines 12, 14 also includes a pair of continuously-variable joints 46. The continuously-variable joints 46 translate rotational torque from the differentials 34, 36 to the wheels 16A, 16B, 18A, 18B. However, those having ordinary skill in the art will appreciate that the drivelines 12, 14 could be configured differently, with or without the use of continuously-variable joints 46, without departing from the scope of the present invention. By way of non-limiting example, it is conceivable that the drivelines 12, 14 could be realized by live axles with integrated hubs (not shown, but generally known in the art).

As will be appreciated from the subsequent description below, the transfer case 26 could be of any suitable type or configuration sufficient to selectively translate rotational torque between the transmission 24 and the drivelines 12, 14 without departing from the scope of the present invention. In traditional "four-wheel-drive" powertrain systems 10, as illustrated in FIG. 1, the transfer case 26 translates rotational torque to the second driveline 14 when the vehicle is operated in "rear-wheel-drive mode," and the transfer case 26 translates rotational torque to both the first and second drivelines 12, 14 when the vehicle is operated in "four-wheel-drive mode". In certain applications, the vehicle driver can decide whether to operate in "two-wheel-drive" or "four-wheel-drive" and can select between the modes using an input control (not shown, but generally known in the art). Alternatively, a controller 48 can be used to automatically move the transfer case 26 between "two-wheel-drive" and "four-wheel-drive" without driver interaction. In other applications, four-wheel-drive powertrain systems 10 are configured as so-called "full-time all-wheel-drive" powertrain systems 10, whereby the transfer case 26 always translates at least some rotational torque to both drivelines 12, 14. The amount of torque translated to each of the drivelines 12, 14 can be allocated according to a fixed ratio, such as via predetermined gearing (not shown, but generally known in the art), or torque can be selectively (or, continuously) adjustable between the drivelines 12, 14 via one or more clutch assemblies (not shown, but generally known in the art).

Irrespective of the specific configuration or type of transfer case 26, it is advantageous to minimize or eliminate parasitic loss, whereby eliminating unnecessary rotation and/or torque translation increases the overall efficiency of the powertrain system 10. To that end, the powertrain system 10 includes a wheel-end disconnect assembly, generally indicated at 50, configured to selectively interrupt rotational torque translation between the wheel hub 42 and the differential 34, 36, as described in greater detail below. In the representative embodiment illustrated throughout the figures, the wheel-end disconnect assembly 50 is assigned to one of the wheels 16A of the first driveline 12. Here, the first differential 34 may be configured as a so-called "open differential" such that translation of rotational torque is effectively interrupted to both of the first pair of wheels 16A, 16B when the wheel-end disconnect assembly 50 interrupts translation of rotational torque to the assigned wheel 16A.

As noted above, the powertrain system 10 and/or drivelines 12, 14 could be configured in a number of different ways. As such, while a single wheel-end disconnect assembly 50 is shown in FIG. 1, those having ordinary skill in the art will appreciate that any suitable number of wheel-end disconnect assemblies 50 could be utilized without departing from the scope of the present invention. By way of non-limiting example, where the first differential 34 is configured as a so-called "locking differential" or a "limited slip differential," it is conceivable that a pair of wheel-end disconnect assemblies 50 could be utilized; one assigned to each wheel 16A, 16B of the first driveline 12. Moreover, while the wheel-end disconnect assembly 50 is shown throughout the figures as cooperating with the knuckle bracket 44 to facilitate torque translation interruption between the wheel hub 42 and the first differential 34 via the continuously-variable joint 46, it is conceivable that one or both of the drivelines 12, 14 could omit a traditional differential 34, 36 and could utilize a clutch assembly to split rotational torque between opposing wheels (not shown, but generally known in the related art).

Referring now to FIGS. 2A-3B, the wheel-end disconnect assembly 50 of the present invention includes the knuckle bracket 44, a clutch assembly, generally indicated at 52, and an electromagnetic actuator, generally indicated at 54. The wheel-end disconnect assembly 50 is adapted for use in selectively translating rotational torque between an output shaft 56 and an assigned wheel hub 42 of an assigned vehicle driveline 12. As noted above, the wheel-end disconnect assembly 50 can be used in a number of different ways and in a number of different powertrain systems 10. As such, it will be appreciated that the specific configuration of the output shaft 56 and wheel hub 42 described herein may vary without departing from the scope of the present invention. Specifically, in the representative embodiments illustrated throughout the figures, the assigned wheel hub 42 includes a hub shaft 58, and the clutch assembly 52 is disposed in selective torque translating relationship between the output shaft 56 and the hub shaft 58. Thus, while the shafts 56, 58 are described in greater detail below as being integrated with the continuously-variable joint 46 and the wheel hub 42, respectively, of the assigned wheel 16A of the assigned driveline 12, those having ordinary skill in the art will appreciate that the hub shaft 58 and/or output shaft 56 could be of any suitable type or configuration, of either driveline 12, 14 of the powertrain system 10, without departing from the scope of the present invention.

As noted above, the wheel-end disconnect assembly 50 includes a clutch assembly 52 and an electromagnetic actuator 54. The clutch assembly 52 is disposed in selective torque translating relationship between the hub shaft 58 and the output shaft 56 and is selectively movable between: an engaged configuration 52A wherein rotational torque is translated between the hub shaft 58 and the output shaft 56 (see FIGS. 2A and 3A), and a disengaged configuration 52B wherein rotational torque is interrupted between the hub shaft 58 and the output shaft 56 (see FIGS. 2B and 3B). As is described in greater detail below, the electromagnetic actuator 54 is adapted to selectively move the clutch assembly 52 between the configurations 52A, 52B.

As noted above, the wheel-end disconnect assembly 50 cooperates with the wheel hub 42 to facilitate selectable rotational torque interruption to the assigned driveline 12. To this end, and as is explained in greater detail below, the wheel hub 42 includes a wheel-side hub member 60, a joint-side hub member 62, and a bearing arrangement 64. The knuckle bracket 44 of the wheel-end disconnect assembly 50 is mounted to the vehicle (not shown in detail, but generally known in the art) and at least partially supports the wheel hub 42; specifically, the wheel-side hub member 60, the joint-side hub member 62, and the bearing arrangement 64. In order to ensure long life of the bearing arrangement 64, one or more seals 66 may be operatively attached to the knuckle bracket 44 adjacent to the joint-side hub member 62 and/or the wheel-side hub member 60. The wheel-side hub member 60 is configured so as to allow the assigned wheel 16A to be selectively attached to and removed from the vehicle, as is known in the art. The knuckle bracket 44 may be mounted directly to the vehicle, or may be mounted to another vehicle component, such as a suspension arm or shock absorber strut assembly (not shown, but generally known in the art).

In the representative embodiment illustrated herein, the wheel-side hub member 60 operatively attached to the joint-side hub member 62, with the knuckle bracket 44 and the bearing arrangement 64 disposed therebetween. Thus, the assigned wheel 16A, the wheel-side hub member 60, and the joint-side hub member 62 rotate together in operation and are supported by the knuckle bracket 44. The wheel hub 42 also includes a hub tooth member 68 that cooperates with the clutch assembly 52, as described in greater detail below. The hub tooth member 68 is coupled to and rotates with the wheel-side hub member 60 and the joint-side hub member 62. To this end, and as is shown best in FIGS. 2A and 3A, a hub collar 70 couples the hub tooth member 68 to the wheel-side hub member 60 and the joint-side hub member 62. Thus, in the representative embodiment illustrated herein, the hub shaft 58 of the driveline 12 is defined by the "wheel side" components of the wheel hub 42 and clutch assembly 52 that rotate together; specifically, the wheel-side hub member 60, the joint-side hub member 62, the hub tooth member 68, and the hub collar 70. However, as noted above, the various components of the wheel hub 42 and/or clutch assembly 52 could be designed, configured, arranged, supported, and/or defined differently without departing from the scope of the present invention.

As noted above, the continuously-variable joint 46 is disposed in selective torque translating relationship with the wheel hub 42. To that end, the continuously-variable joint 46 includes a joint end 72 that has a joint tooth portion 74, a joint end portion 76, and a joint body portion 78 extending between the joint tooth portion 74 and the joint end portion 76. The joint tooth portion 74 cooperates with the hub tooth member 68 and other components of the clutch assembly 52 so as to facilitate selective rotational torque interruption between the continuously-variable joint 46 and the wheel hub 42, as described in greater detail below. The joint end portion 76 and the joint body portion 78 cooperate with the wheel hub 42 so as to axially constrain the continuously-variable joint 46 with respect to the wheel hub 42 and allow independent rotation of the wheel hub 42 with respect to the continuously-variable joint 46 when rotational torque is interrupted therebetween. To these ends, an axle nut 80, an end bearing 82, and a joint bushing 84 are provided. The axle nut 80 retains the joint end portion 76 to the wheel-side hub member 60. The end bearing 82 and the joint bushing 84 are operatively attached to the wheel-side hub member 60 and facilitate alignment and selective independent rotation between the wheel hub 42 and continuously-variable joint 46, as noted above. In the representative embodiment illustrated herein, the output shaft 56 of driveline 12 is defined by the "joint side" components that rotate together; specifically, the joint end 72 and the continuously-variable joint 46. However, those having ordinary skill in the art will appreciate that the joint end 72 could be designed or configured in any suitable way, from any suitable number of components, without departing from the scope of the present invention.

As noted above, the clutch assembly 52 is adapted to selectively interrupt rotational torque between the output shaft 56 and the hub shaft 58 of the wheel hub 42. To that end, in one embodiment, the clutch assembly 52 includes a sleeve 86 that acts to couple the hub shaft 58 and the output shaft 56 when the clutch assembly 52 is in the engaged configuration 52A. The sleeve 86 is disposed in force translating relationship with the electromagnetic actuator 54 such that the sleeve 86 couples the hub tooth member 68 to the joint tooth portion 74 when the clutch assembly 52 is in the engaged configuration 52A. When the clutch assembly 52 is in the disengaged configuration 52B, the electromagnetic actuator 54 moves the sleeve 86 away from the hub tooth member 68. To that end, in one embodiment, the clutch assembly 52 further includes a fork 88 operatively attached to the electromagnetic actuator 54 and disposed in force translating relationship with the sleeve 86. Those having ordinary skill in the art will recognize the arrangement of the hub tooth member 68, the joint tooth portion 74, the sleeve 86, and the fork 88 as forming what is commonly referred to as a "dog clutch" clutch assembly 52, whereby the hub tooth member 68 and joint tooth portion 74 have external teeth (not shown in detail, but generally known in the related art) that cooperate with internal teeth of the sleeve 86 (not shown in detail, but generally known in the related art) to facilitate selective rotational torque interruption.

As noted above, the wheel-end disconnect assembly 50 of the present invention includes an electromagnetic actuator 54 that cooperates with the clutch assembly 54 so as to facilitate selective interruption of rotational torque to the assigned wheel 16A. It will be appreciated that the electromagnetic actuator 54 can be configured in a number of different ways, depending on the application. By way of non-limiting example, two different embodiments of the electromagnetic actuator 54 of the wheel-end disconnect assembly 50 of the present invention are described herein. For the purposes of clarity and consistency, unless otherwise indicated, subsequent discussion of the electromagnetic actuator 54 will refer to features, and components that are common between the embodiments. Additionally, the specific differences between the embodiments will be described in detail.

Referring now to FIGS. 2A-3B, the electromagnetic actuator 54 of the wheel-end disconnect assembly 50 is adapted to selectively move the clutch assembly 52 between the configurations 52A, 52B. To that end, the electromagnetic actuator 54 includes a slider 90 that is selectively movable between a first stable position 90A and a second stable position 90B. Further, the electromagnetic actuator 54 is disposed in force translating relationship with the clutch assembly 52 such that movement of the slider 90 from one of the stable positions 90A to the other of the stable positions 90B causes corresponding movement of the clutch assembly 52 between the configurations 52A, 52B so as to selectively translate rotational torque between the output shaft 56 of the driveline 12 and the wheel hub 42 of the driveline 12, as discussed above. To that end, the slider 90 of the electromagnetic actuator 54 is disposed in force translating relationship with the fork 88 of the clutch assembly 52 which, in turn, is adapted to translate force to the sleeve 86 of the clutch assembly 52. In the representative embodiments illustrated herein, the fork 88 is slidably supported to a fork shaft 92 and slides therealong in response movement of the slider 90 between the stable positions 90A, 90B. However, as will be appreciated from the subsequent description of the electromagnetic actuator 54 below, the slider 90 could be configured or otherwise defined in a number of different ways without departing from the scope of the present invention. As such, the wheel-end disconnect assembly 50 could be designed so as to translate force from the electromagnetic actuator 54 to the clutch assembly 54 without the use of a fork 88 without departing from the scope of the present invention.

In one embodiment, the wheel-end disconnect assembly 50 includes an actuator housing 94 and a mounting housing 96. The actuator housing 94 supports the various components of the electromagnetic actuator 54 described in greater detail below. Likewise, the mounting housing 96 supports the actuator housing 94 and the fork shaft 92, and is operatively attached to the knuckle bracket 44. However, it will be appreciated that the electromagnetic actuator 54 could be operatively attached to and/or supported by the knuckle bracket 44 in a number of different ways and, thus, the actuator housing 94 and/or the mounting housing 96 could be configured in any suitable way, or could be omitted entirely, without departing from the scope of the present invention.

Figure 2A:
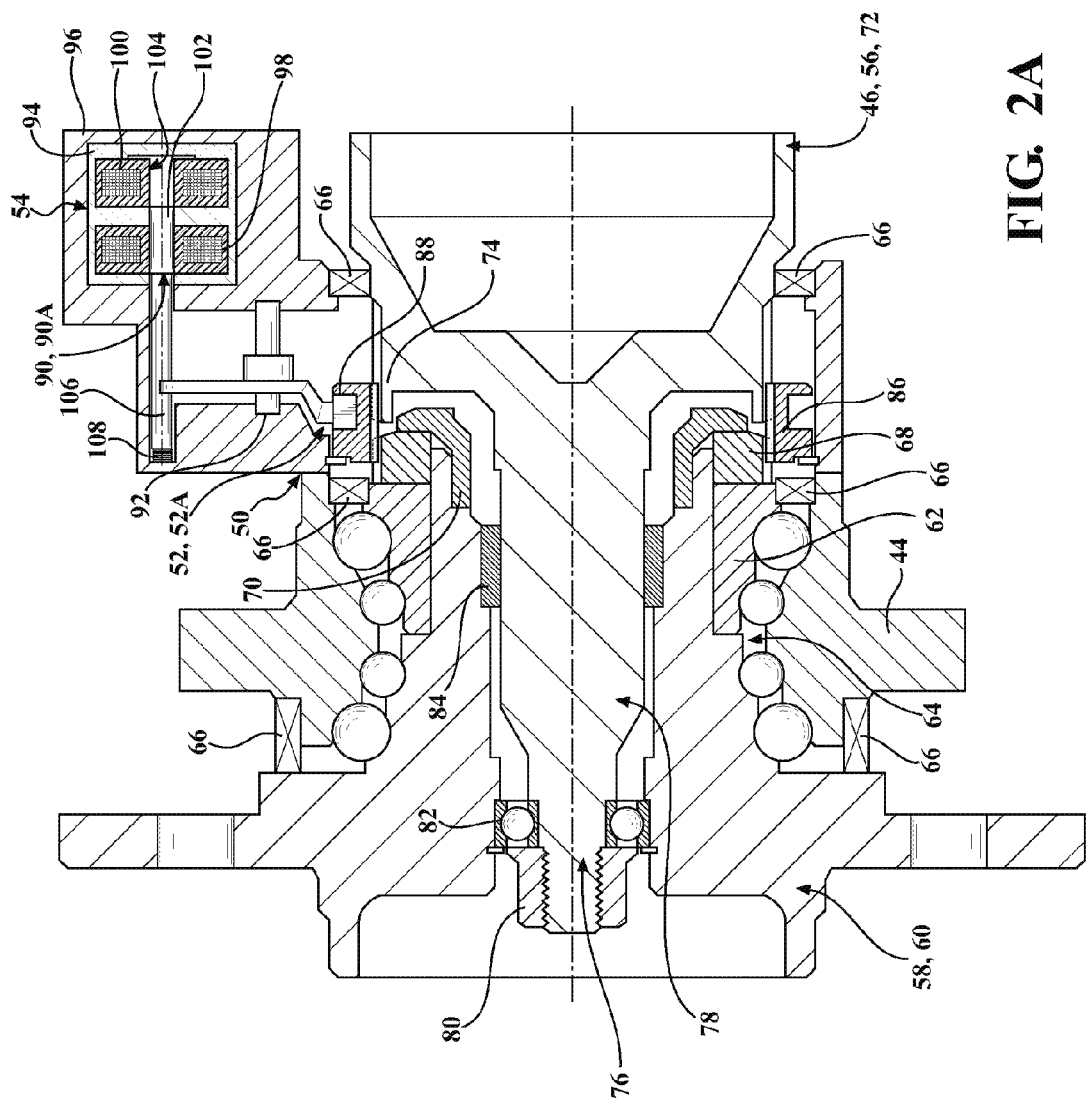
FIG. 2A is a sectional view of the wheel hub of FIG. 1 and a first embodiment of the wheel-end disconnect assembly of the present invention shown in an engaged configuration.
Figure 2B:
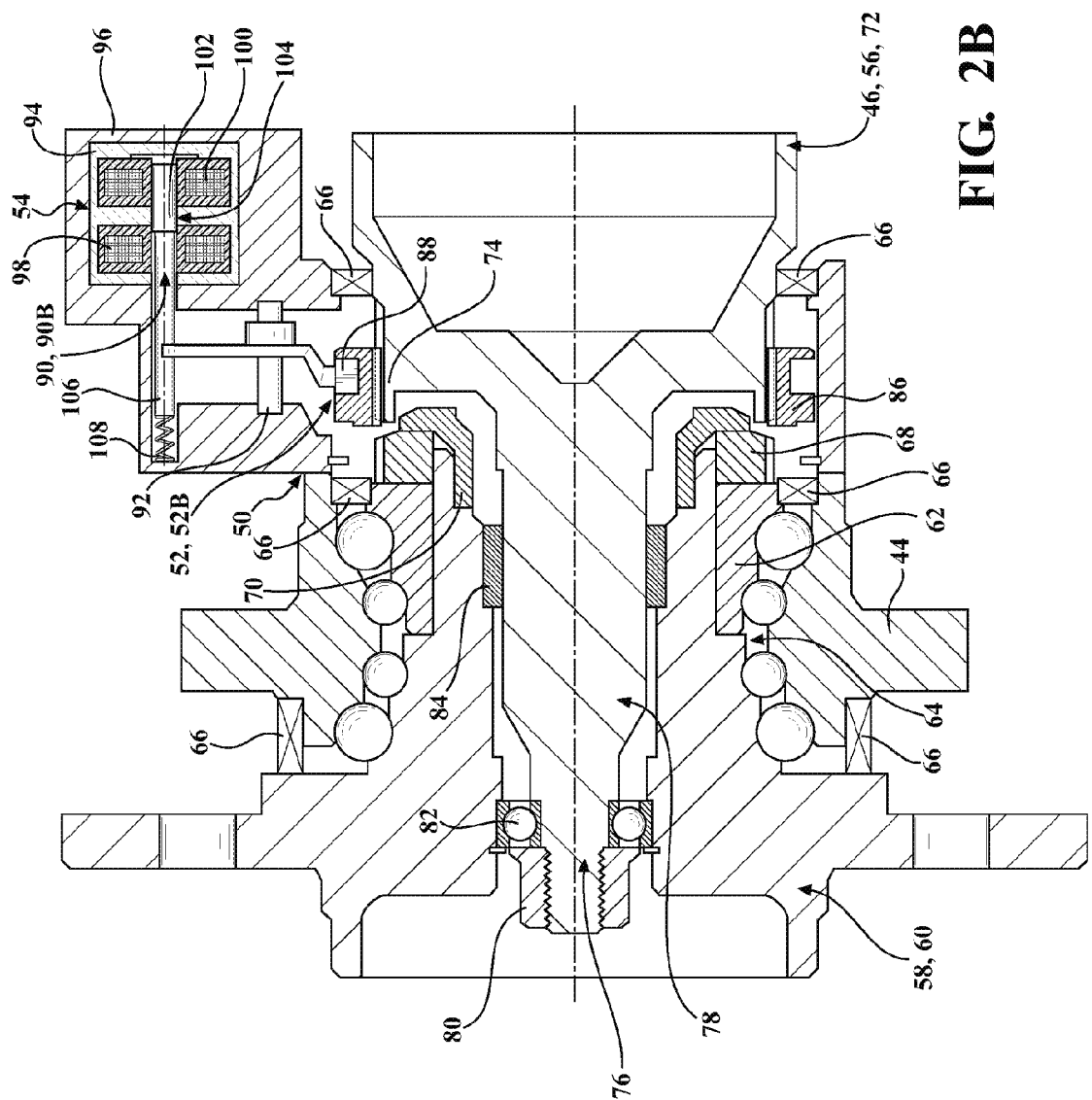
FIG. 2B is a sectional view of the wheel hub and the wheel-end disconnect assembly of FIG. 2A shown in a disengaged configuration.

Referring now to FIGS. 2A-2B, a first embodiment of the electromagnetic actuator 54 of the wheel-end disconnect assembly 50 is shown. In this embodiment, the electromagnetic actuator 54 includes a first coil 98, a second coil 100, and a permanent magnet 102. The first coil 98 acts to selectively generate a first magnetic field. The second coil 100 is spaced from the first coil 98 and acts to selectively generate a second magnetic field. The permanent magnet 102 is operatively attached to the slider 90 such that predetermined changes in the first magnetic field and/or the second magnetic field urge the slider 90 from one of the stable positions 90A (or, 90B) to the other stable position 90B (or, 90A). In this embodiment, the actuator housing 94 has a cylinder 104 defined therein that supports the slider 90, and the slider 90 is further defined as a shaft 106 supported in and movable along the cylinder 104 between the stable positions 90A, 90B. Thus, the permanent magnet 102 is operatively attached to the shaft 106 such that predetermined changes in the magnetic field generated by the coils 98, 100 urge the permanent magnet 102 and, thus, the shaft 106 along the cylinder 104, whereby the shaft 106 translates force to the fork 88 which, in turn, slides along the fork shaft 92 and translates force to the sleeve 86 so as to move the clutch assembly 52 between the configurations 52A, 52B, as described above. In one embodiment, at least one spring 108 is interposed between the actuator housing 94 and the shaft 106. The spring 108 cooperates with the coils 98, 100 so as to urge the shaft 106 from one stable position 90A (or, 90B) to the other stable position 90B (or, 90A), as is described in greater detail below.

The second coil 100 is spaced from the first coil 98 such that the first magnetic field and/or the second magnetic field urges the slider 90 from one of the stable positions 90A to the other of the stable positions 90B so as to cause corresponding movement of the clutch assembly 52 between the configurations 52A, 52B, as noted above. In one embodiment, the first coil 98 and/or the second coil 100 are aligned with the slider 90. More specifically, in the embodiment illustrated in FIGS. 2A and 2B, both the first coil 98 and the second coil 100 are substantially aligned with the shaft 106, and the permanent magnet 102 is disposed between the first coil 98 and the second coil 100. However, those having ordinary skill in the art will appreciate that the permanent magnet 102 could be disposed in any suitable location sufficient to move the slider 90 between the stable positions 90A, 90B, without departing from the scope of the present invention. Further, those having ordinary skill in the art will appreciate that the first coil 98, the second coil 100, and/or the permanent magnet 102 could be configured, disposed, or otherwise arranged in any suitable way, with any suitable shape or profile, without departing from the scope of the present invention.

In the representative embodiment illustrated in FIGS. 2A and 2B, the permanent magnet 102 is operatively attached to the shaft 106 for concurrent movement between the stable positions 90A, 90B. Here, the permanent magnet 102 is a unitary, one-piece component and has a substantially annular profile. However, those having ordinary skill in the art will appreciate that the permanent magnet 102 could have any suitable configuration sufficient to cooperate with the first coil 98 and/or the second coil 100 so as to urge the slider 90 between the stable positions 90A, 90B without departing from the scope of the present invention.

In one embodiment, the controller 48 is disposed in electrical communication with the coils 98, 100 for selectively generating and/or reversing the polarity of the magnetic fields so as to move the slider 90 between the stable positions 90A, 90B. To that end, the controller 48 may be adapted to direct electrical charge through the coils 98, 100 such that the magnetic fields are induced by the flow of electrical charges in the coils 98, 100. Here, a change in the direction of the flow of electrical charges in the coils 98, 100 causes a corresponding reversal of the generated magnetic fields. Those having ordinary skill in the art will appreciate that the controller 48 can be adapted to selectively flow current through each coil 98, 100 either independently or simultaneously. Likewise, the controller 48 can be configured to selectively reverse current flow through each coil 98, 100 either independently or simultaneously. Further, it will be appreciated that the coils 98, 100 could be wound in opposite directions (for example, the first coil 98 could be wound clockwise and the second coil 100 could be wound counterclockwise) or, alternatively, both coils cold be would in the same direction (for example, both the first coil 98 and the second coil 100 could be wound clockwise). The controller 48, also commonly referred to in the related art as an "electronic control module" may also be employed so as to control the transfer case 26, as noted above.

As will be appreciated from the subsequent description below, the stable positions 90A, 90B are configured so as to allow the electromagnetic actuator 54 to maintain the selected clutch assembly 52 configuration 52A, 52B without necessitating that the first coil 98 or the second coil 100 be continuously energized. Those having ordinary skill in the art will recognize this as a so-called "bi-stable" electromagnetic actuator 54 configuration. Thus, the controller 48 could be configured so as momentarily direct electrical charges the first coil 98 and/or the second coil 100 until the clutch assembly 52 changes between configurations 52A, 52B, at which time the coil(s) 98, 100 could be subsequently de-energized. In particular, and because continuous application of electrical current is not required to hold the slider 90 in the stable positions 90A, 90B, the controller 48 could be configured to sense which of the stable positions 90A, 90B the slider 90 is in (and, thus, which of the configurations 52A, 52B the clutch assembly 52 is in), such as via measuring or otherwise determining inductance in the coil(s) 98, 100.

Figure 3A:
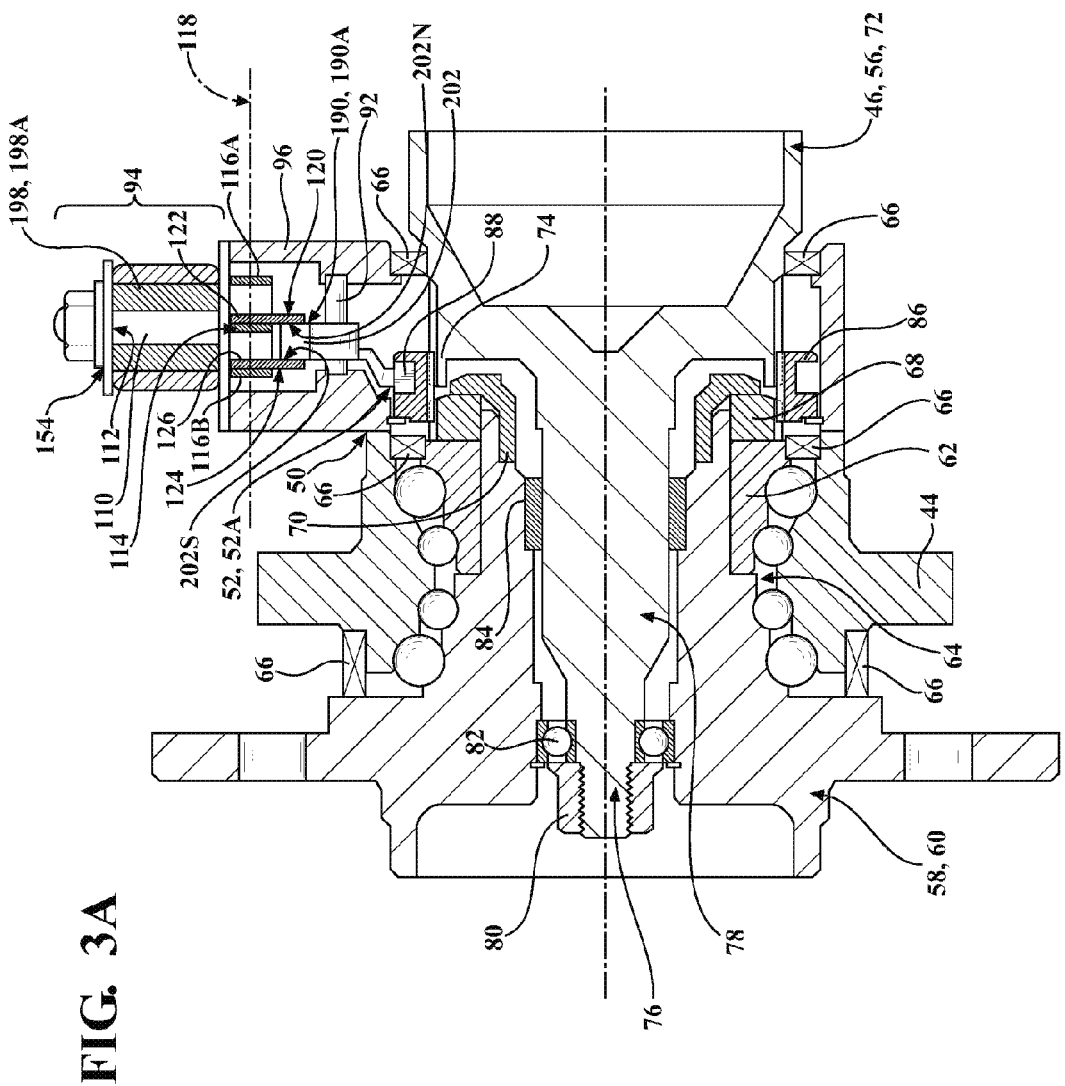
FIG. 3A is a sectional view of the wheel hub of FIG. 1 and a second embodiment of the wheel-end disconnect assembly of the present invention shown in an engaged configuration.
Figure 3B:
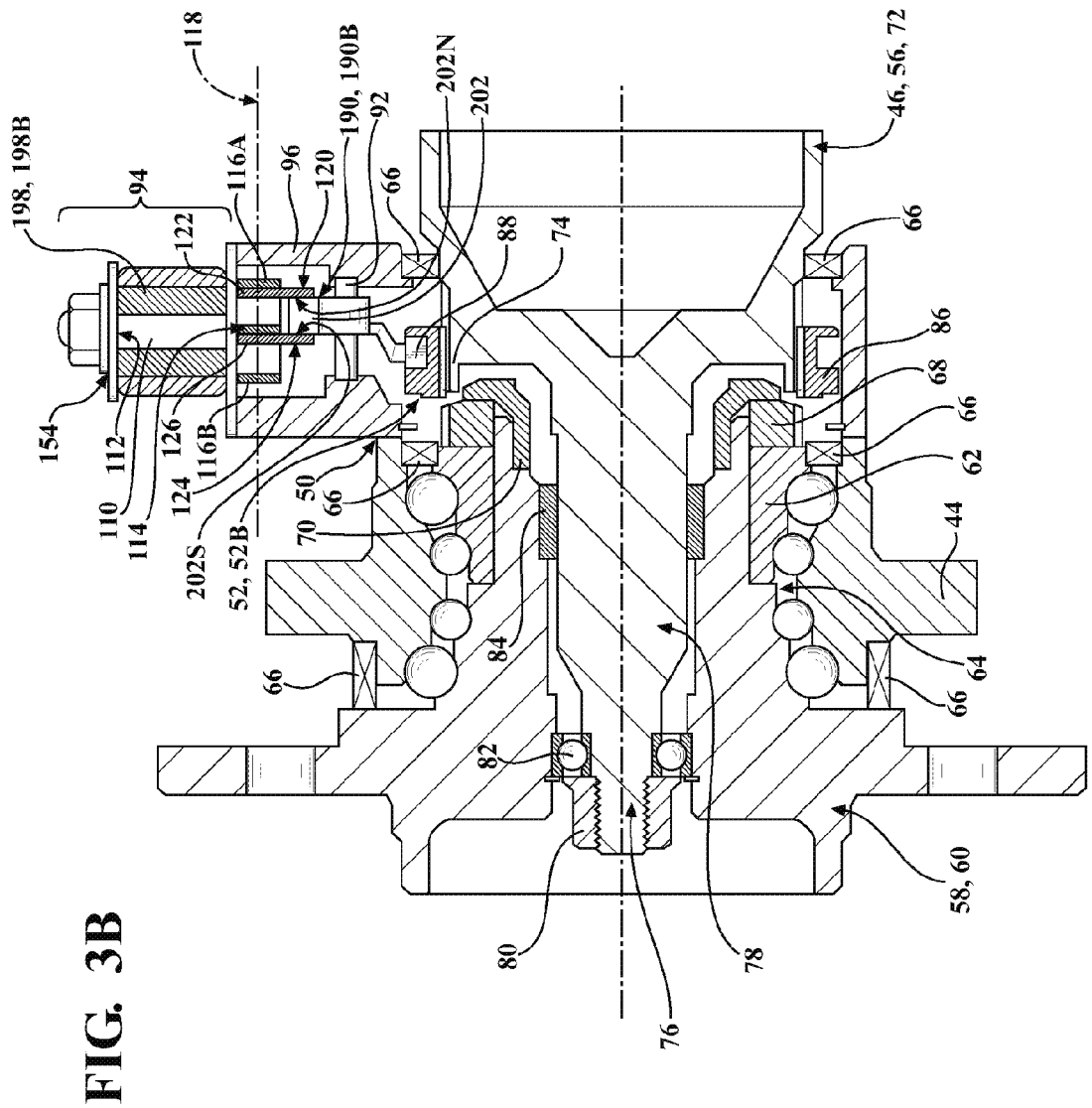
FIG. 3B is a sectional view of the wheel hub and the wheel-end disconnect assembly of FIG. 3A shown in a disengaged configuration.

As noted above, a second embodiment of the electromagnetic actuator 54 of the wheel-end disconnect assembly 50 of the present invention is shown in FIGS. 3A and 3B. In the description that follows, non-identical components of the second embodiment of the electromagnetic actuator 54 are provided with the same reference numerals used in connection with the first embodiment of the electromagnetic actuator 54 increased by 100.

Referring now to FIGS. 3A and 3B, the second embodiment of the electromagnetic actuator 154 of the wheel-end disconnect assembly 50 of the present invention is shown. In this second embodiment, the electromagnetic actuator 154 includes a single coil 198 that acts to selectively generate a magnetic field. The permanent magnet 202 is likewise operatively attached to the slider 190 such that predetermined changes in the magnetic field generated by the single coil 198 urges the slider 190 from one of the stable positions 190A (or, 190B) to the other stable position 190B (or, 190A) so as to cause corresponding movement of the clutch assembly 52 between the configurations 52A, 52B. To that end, the controller 48 is disposed in electrical communication with the single coil 198 for selectively generating and/or reversing the polarity of the magnetic field, as discussed in greater detail above in connection with the first embodiment of the electromagnetic actuator 54. Likewise, the controller 48 can also be configured so as to determine the relative position of the slider 190 between the stable positions 190A, 190B based on inductance in the single coil 198.

In this embodiment, the electromagnetic actuator 154 further includes a core 110 having a first magnetic pole 112 and a second magnetic pole 114 spaced from the first magnetic pole. The core 110 is adapted to direct the magnetic field generated by the signal coil 198 to the first magnetic pole 112 and to the second magnetic pole 114. The first magnetic pole 112 includes a pair of first magnetic pole elements 116A, 116B spaced from each other along a common reference axis 118 (physical connection to first magnetic pole 112 not shown in detail). The second magnetic pole 114 is spaced between the first magnetic pole elements 116A, 116B along the common reference axis 118. In one embodiment, the permanent magnet 202 has opposing north and south ends 202N, 202S, and the electromagnetic actuator 154 further includes a north blade 120 with a north blade end 122, and a south blade 124 with a south blade end 126. The north blade 120 is operatively attached to the north end 202N of the permanent magnet 202 and extends to the north blade end 122. The north blade end 122 is disposed along the common reference axis 118 between the second magnetic pole 114 of the core 110, and one of the first magnetic pole elements 116A (or, 116B) of the core 110. The south blade 124 is operatively attached to the south end 202S of the permanent magnet 202 and extends to the south blade end 126. The south blade end 126 is disposed along the common reference axis 118 between the second magnetic pole 114 of the core 110, and the other of the first magnetic pole elements 116B (or, 116A) of the core 110. In this embodiment of the electromagnetic actuator 154 of the wheel-end disconnect assembly 50 of the present invention, the magnetic field generated by the single coil 198 is selectively reversible between a first magnetic field orientation 198A and a second magnetic field orientation 198B. In the first magnetic field orientation 198A (see FIG. 3A), the first magnetic pole elements 116A, 116B of the core 110 attract the north blade end 122 and repel the south blade end 126; and the second magnetic pole 114 of the core 110 attracts the south blade end 126 and repels the north blade end 122, thereby urging the slider 90 to one of the stable positions 90A (or, 90B). In the second magnetic field orientation 198B (see FIG. 3B), the first magnetic pole elements 116A, 116B of the core 110 attract the south blade end 126 and repel the north blade end 120; and the second magnetic pole 114 of the core 110 attracts the north blade end 122 and repels the south blade end 126, thereby urging the slider 90 to the other of the stable positions 90B (or, 90A). In one embodiment, the north blade 120, the south blade 124, and/or the core 110 are manufactured from a ferrous material. However, those having ordinary skill in the art will appreciate that the various components of the electromagnetic actuator 154 could be designed, configured, and/or manufactured in any suitable way, and from any suitable material sufficient to translate force so as to move the slider 90 between the stable positions 90A, 90B so to cause corresponding movement of the clutch assembly 52 between the configurations 52A, 52B, as discussed above.

In this way, the rotational wheel-end disconnect assembly 50 of the present significantly improves the performance of vehicle powertrain systems 10 by enabling simple and space-efficient implementation of selective rotational torque interruption. More specifically, those having ordinary skill in the art will appreciate that the wheel-end disconnect assembly 50 of the present invention is configured such that the clutch assembly 52 can remain in either configuration 52A, 52B without necessitating that the electromagnetic actuator 54, 154 be continuously supplied with electrical current. Moreover, it will be appreciated that the permanent magnet 102, 202 can be configured so as to significantly minimize the overall packaging size of the electromagnetic actuator 54, 154 and wheel-end disconnect assembly 50. Further, the present invention can be used in connection with a number of different types of powertrain systems 10, in a number of different ways, and reduces the cost and complexity of manufacturing vehicles that have superior operational characteristics, such as high efficiency, reduced weight, component packaging, component life, and vehicle drivability.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:
1. A wheel-end disconnect assembly for use in selectively translating rotational torque between an output shaft and a wheel hub of a vehicle driveline, said wheel-end disconnect assembly comprising:
a knuckle bracket at least partially supporting the wheel hub;
a clutch assembly operatively attached to said knuckle bracket, disposed in selective torque translating relationship between the output shaft and the wheel hub, and movable between: an engaged configuration wherein rotational torque is translated between the output shaft and the wheel hub, and a disengaged configuration wherein rotational torque is interrupted between the output shaft and the wheel hub; and
an electromagnetic actuator having a slider selectively movable between a first stable position and a second stable position, said actuator being disposed in force translating relationship with said clutch assembly such that movement of said slider from one of said stable positions to the other of said stable positions causes corresponding movement of said clutch assembly between said configurations so as to selectively trans- late rotational torque between the output shaft of the driveline and the wheel hub of the driveline;

wherein said actuator includes: a coil that acts to selectively generate a magnetic field, and a permanent magnet operatively attached to said slider such that predetermined changes in said magnetic field generated by said coil urge said slider from one of said stable positions to the other of said stable positions;

a controller in electrical communication with said coil for selectively generating and/or reversing the polarity of said magnetic field;

wherein said controller is adapted to determine a relative position of said slider between said stable positions based on inductance of said coil.

2. The wheel-end disconnect assembly as set forth in claim 1, wherein said actuator further includes a core having a first magnetic pole and a second magnetic pole spaced from said first magnetic pole, said core being adapted to direct said magnetic field generated by said coil to said first magnetic pole and to said second magnetic pole.

3. The wheel-end disconnect assembly as set forth in claim 2, wherein said first magnetic pole includes a pair of first magnetic pole elements spaced from each other along a common reference axis, and wherein said second magnetic pole is spaced between said first magnetic pole elements along said common reference axis.

4. The wheel-end disconnect assembly as set forth in claim 3, wherein said permanent magnet has opposing north and south ends, and wherein said actuator further includes:

a north blade operatively attached to said north end of said permanent magnet and extending to a north blade end disposed along said common reference axis between said second magnetic pole and one of said first magnetic pole elements of said core, and a south blade operatively attached to said south end of said permanent magnet and extending to a south blade end disposed along said common reference axis between said second magnetic pole and the other of said first magnetic pole elements of said core.

5. The wheel-end disconnect assembly as set forth in claim 4 wherein said magnetic field generated by said coil is selectively reversible between:

a first magnetic field orientation wherein said first magnetic pole elements of said core attract said north blade end and repel said south blade end, and wherein said second magnetic pole of said core attracts said south blade end and repels said north blade end, thereby urging said slider to one of said stable positions; and a second magnetic field orientation wherein said first magnetic pole elements of said core attract said south blade end and repel said north blade end, and wherein said second magnetic pole of said core attracts said north blade end and repels said south blade end, thereby urging said slider to the other of said stable positions.

6. The wheel-end disconnect assembly as set forth in claim 4, wherein said north blade, said south blade, and/or said core is manufactured from a ferrous material.

7. The wheel-end disconnect assembly as set forth in claim 1, wherein said actuator includes: a first coil that that acts to selectively generate a first magnetic field, a second coil spaced from said first coil and acting to selectively generate a second magnetic field, and a permanent magnet operatively attached to said slider such that predetermined changes in said first magnetic field and/or said second magnetic field urge said slider from one of said stable positions to the other of said stable positions.

8. The wheel-end disconnect assembly as set forth in claim 7, wherein said first coil and said second coil are aligned with said slider.

9. The wheel-end disconnect assembly as set forth in claim 7, wherein said permanent magnet is disposed between said first coil and said second coil.

10. The wheel-end disconnect assembly as set forth in claim 7, wherein said permanent magnet has a substantially annular profile.

11. The wheel-end disconnect assembly as set forth in claim 7, wherein said first coil is wound in a first direction, said second coil is wound in a second direction, and wherein said second direction is opposite to said first direction.

12. The wheel-end disconnect assembly as set forth in claim 7, further including a controller in electrical communication with said first coil and said second coil for selectively generating and/or reversing the polarity of said first magnetic field and/or said second magnetic field.

13. The wheel-end disconnect assembly as set forth in claim 12, wherein said controller simultaneously generates said first magnetic field and said second magnetic field so as to urge said slider to one of said stable positions, and wherein said controller also simultaneously reverses the polarity of said first magnetic field and said second magnetic field so as to urge said slider to the other of said stable positions.

14. The wheel-end disconnect assembly as set forth in claim 12, wherein said controller generates said first magnetic field so as to urge said slider to one of said stable positions, and wherein said controller generates said second magnetic field so as to urge said slider to the other of said stable positions.

15. The wheel-end disconnect assembly as set forth in claim 1, wherein said actuator includes an actuator housing operatively attached to said knuckle bracket, and wherein said actuator housing has a cylinder defined therein with said slider supported in and moveable along said cylinder between said stable positions.

16. The wheel-end disconnect assembly as set forth in claim 15, wherein said slider is further defined as a shaft supported in and moveable along said cylinder between said stable positions.

17. The wheel-end disconnect assembly as set forth in claim 16, wherein said clutch assembly includes: a sleeve disposed in force translating relationship with said shaft and acting to couple the output shaft and the wheel hub when said clutch assembly is in said engaged configuration.

* * * * *